United States Patent [19]

Gawthrop

[11] 3,863,594
[45] Feb. 4, 1975

[54] BOAT TRAILER BACKUP GUIDE
[76] Inventor: Theo C. Gawthrop, 121 N. Elm St., Columbia City, Ind. 46725
[22] Filed: Aug. 6, 1973
[21] Appl. No.: 385,991

[52] U.S. Cl. ............................ 116/28 R, 33/264
[51] Int. Cl. ............................................ B60g 9/00
[58] Field of Search ............... 116/28 R, 63 P, 114; 40/129 C; 33/264

[56] References Cited
UNITED STATES PATENTS

| | | | |
|---|---|---|---|
| 3,064,617 | 11/1962 | Meagher | 116/28 R |
| 3,520,273 | 7/1970 | Daifotes | 116/28 R |
| 3,563,200 | 2/1971 | Grossman | 116/28 R |
| 3,683,842 | 8/1972 | Logan | 116/28 R |

FOREIGN PATENTS OR APPLICATIONS
5,006   1914   Great Britain .................. 40/129 C

*Primary Examiner*—Richard C. Queisser
*Assistant Examiner*—Daniel M. Yasich

[57] ABSTRACT

A guide device adapted to be fixedly secured to the rear portion of a boat trailer or the like which enables the driver of a towing vehicle to observe the position of the trailer when there is no boat thereon. The device is manually movable between raised and lowered positions, detent means maintaining the device in its raised position and the device being beneath the supporting portions of the trailer when in its stored position.

2 Claims, 3 Drawing Figures

PATENTED FEB 4 1975 3,863,594
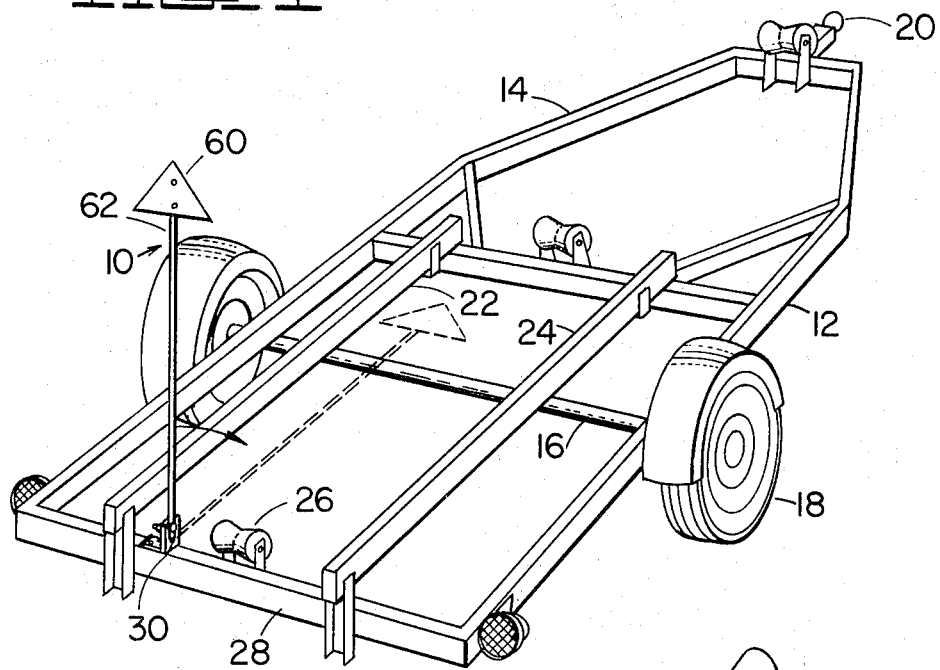
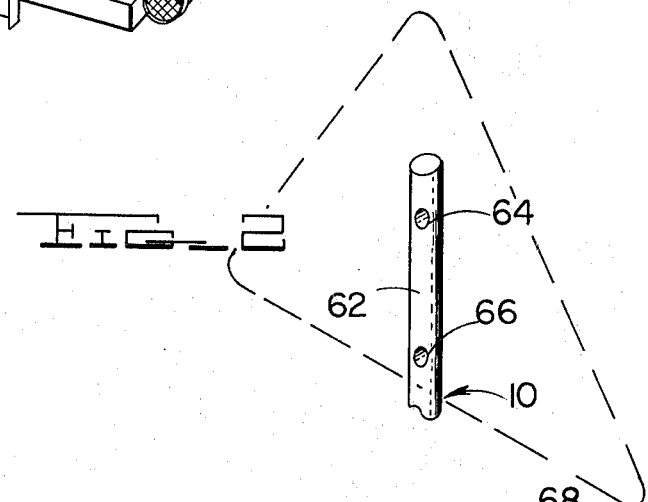
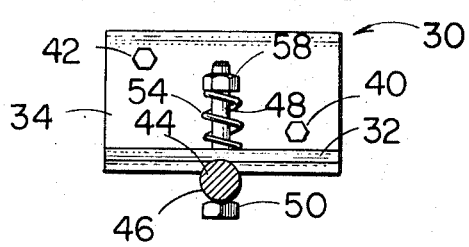
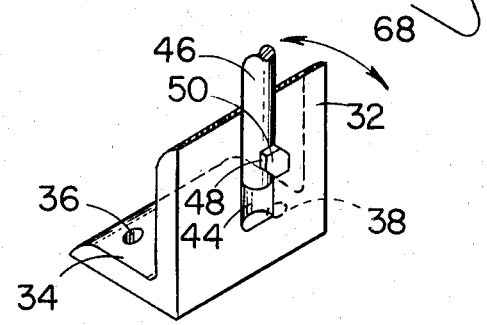

BOAT TRAILER BACKUP GUIDE

BACKGROUND OF THE INVENTION

1. Field of the Invention

The present invention relates to a guide for use on a low profile trailer such as a boat trailer and in particular to such a device which enables the driver of a towing vehicle to observe the position of the trailer when no boat is thereon and the highest portions of the trailer are below the normal field of view from the towing vehicle.

2. Description of the Prior Art

Guide devices secured to the rear portion of a boat trailer are known. One such device is disclosed in U.S. Pat. No. 3,064,617 to Meagher. Such devices present some problems in that the indicators are unduly complex, are flexible whereby the device does not present a stable viewing target, or are too costly to manufacture. Further, some such devices engage the boat or other object when same is loaded on the trailer thereby rubbing against the hull or portions thereof and may become wedged between the object being loaded and the trailer.

SUMMARY OF THE INVENTION

The invention is a guide device for use on a low profile trailer such as a boat trailer. The device includes a bracket adapted to be fixedly secured to the rear portion of the trailer, and an elongated rod pivotably coupled to the bracket for swinging movement between a raised and a lowered position. Detent means are provided for maintaining the guide in its raised position when it has been manually moved thereto. When the device is in its lowered position, it is disposed beneath the supporting surfaces of the trailer whereby it does not contact or otherwise interfere with the boat or other objects loaded thereon.

In one specific embodiment of the invention the distal end of the elongated rod is provided with an enlarged plackard to facilitate viewing of the guide.

It is therefore an object of the invention to provide an improved backup guide for use on a low profile trailer or the like.

It is another object of the invention to provide such a device which can be simply and easily manually moved between a raised and a lowered position.

It is still another object of the invention to provide such a device which is disposed beneath all of the supporting surfaces of the trailer when in its lowered position.

It is still another object of the invention to provide such a device which includes detent means for maintaining the guide in an upright position when it has been manually moved thereto.

It is yet another object of the invention to provide such a guide which can be readily secured to a wide variety of low profile trailers without alteration thereof.

It is another object of the invention to provide such a guide which does not interfere with or otherwise contact a boat or other object being loaded upon the trailer.

It is still another object of the invention to provide such a device which provides a stable viewing target when in its raised position.

BRIEF DESCRIPTION OF THE DRAWINGS

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is a perspective view of a typical low profile boat trailer having a backup guide of the present invention secured thereto;

FIG. 2 is a perspective view showing details of the mounting bracket and detent means of the present invention; and FIG. 3 is a top plan view of the bracket.

DESCRIPTION OF THE PREFERRED EMBODIMENT

Referring now to the drawings, there is shown in FIG. 1 a trailer backup guide, indicated generally at 10 mounted on a low profile boat trailer 12. Trailer 12 is conventional and typically comprises an open framework 14 supported on an axle 16 and wheels 18. Trailer 12 is towed by means of a standard trailer hitch 20. On such a trailer adapted for carrying boats, frame 14 further typically includes a pair of supporting skids 22, 24 and a plurality of V-groove rollers as at 26 which facilitate loading and unloading of the boat on the trailer 12 and provides support therefor when the boat is in transit.

Backup guide 10 is mounted to the rear portion of trailer 12. In the illustrated example, backup guide 10 is secured to a laterally extending frame member 28 of trailer frame 14.

Referring now to FIG. 2, backup guide 10 includes a mounting bracket 30. Bracket 30 may be formed from stock material such as angle iron and includes verticle and horizontal legs 32, 34, respectively. Leg 34 is provided with a pair of through holes 36, 38 through which are received threaded fasteners 40, 42, respectively (FIG. 3 only) thereby to secure bracket 30 to frame member 28. Fasteners 40, 42 are secured by means of nuts and lock washers (not shown) in conventional manner.

A recess 44 having an arcuate cross-section is formed in leg 32. Recess 44 extends vertically with respect to the ground when bracket 30 is installed on the trailer 12. An elongated rod which may be made of any suitable material such as aluminum or fiberglass and having a diameter complementary to the cross-sectional radius of recess 44 is received in the recess 44 as best seen in FIG. 3. Rod 46 is provided with a clearance hole therethrough (not shown) through which is slidably received an elongated fastener 48 having an enlarged head 50. Similarly, a clearance hole is provided in leg 32 within recess 44 whereby fastener 48 passes freely therethrough. A helical compression spring 54 is disposed concentrically about the end of fastener 48 distal head 50. Spring 54 is compressibly urged against leg 34 by means of a nut 58 threadingly received on the end of fastener 48 distal head 50 as best seen in FIG. 3.

A generally flat plate or plackard 60 is secured to the distal end 62 of rod 46 by means of rivets or the like 64, 66. Element 60 is disposed laterally with respect to the longitudinal axis (not shown) of trailer 12 when the backup guide has been mounted on the trailer 12.

In use, once the backup guide has been affixed to the rear portion of the trailer 12, it can be manually raised and lowered as indicated by arrow 68. In lowered position, shown in dashed lines in FIG. 1 only, the backup guide is seen to assume a position which is beneath all of the supporting portions of the trailer 12. Correspondingly, the backup guide, when in its lowered position, does not interfere with loading, unloading, or otherwise contact the surface of a boat or the like object which is mounted upon the trailer.

Conversely, when the backup guide 10 is in its raised position as shown in solid lines in FIG. 1, flag element 60 provides a readily observed target which can be viewed from the rear view mirror or the back window of a towing vehicle. This, in turn, provides the necessary means to enable the driver of a towing vehicle to back the trailer 12 both more accurately and with greater safety. Further, by reason of the length of the rod element 46, the backup guide 10 can be observed even when the trailer 12 is being backed down an embankment as is typically the case when a boat is being loaded or unloaded from the trailer 12 into or out of the water.

The detent means which includes fastener 50, spring 54, and nut 58, positively maintains the backup guide in its raised position once it has been manually placed therein. The rigidity of rod element 46 and the positive action of the detent means effects a stable viewing target. When it is desired to lower the backup guide to its stowed position, it is only necessary for the user to press against the elongated rod 46 thereby causing the element to fold out of the way beneath the supporting surfaces of the trailer.

It will also be observed that, in the event that the user forgets to lower the backup guide, by reason of its structure and positioning, the boat or other object being loaded upon the trailer will simply press against the backup guide moving it into its lowered position.

The structure of the backup guide is simple and can be manufactured economically. Further, the structure is rugged and reliable in its operation.

While there have been described above the principles of this invention in connection with specific apparatus, it is to be clearly understood that this description is made only by way of example and not as a limitation to the scope of the invention.

What is claimed is:

1. In combination with a boat trailer including a frame having front and rear ends, a pair of laterally spaced, parallel, longitudinally extending skid elements having front and rear ends for supporting a boat thereon, and laterally extending frame members connecting said skid elements adjacent their respective front and rear ends; a backup guide device comprising a mounting bracket secured to the laterally extending rear end member and between said skid elements, an elongated rod having opposite ends, one of said rod ends being pivotally connected to said bracket for manual movement of said rod only in the direction fore and aft of said frame between a first position extending generally vertically upwardly from said frame and a second position extending forwardly from said member between said skid elements beneath and spaced from a boat thereon, resilient detent means on said bracket for maintaining said rod in said first position thereof, and a flag element on the other of said rod ends.

2. The device of claim 1 wherein said backup guide rod is of such length to permit viewing said flat element from a towing vehicle as the vehicle is backing said trailer.

* * * * *